United States Patent
Yui et al.

(10) Patent No.: US 10,672,126 B2
(45) Date of Patent: Jun. 2, 2020

(54) IMAGE PROCESSING APPARATUS AND MAGNETIC RESONANCE IMAGING APPARATUS

(71) Applicant: Toshiba Medical Systems Corporation, Otawara-shi (JP)

(72) Inventors: Masao Yui, Otawara (JP); Hitoshi Yamagata, Otawara (JP)

(73) Assignee: Canon Medical Systems Corporation, Otawara-shi (JP)

( * ) Notice: Subject to any disclaimer, the term of this patent is extended or adjusted under 35 U.S.C. 154(b) by 10 days.

(21) Appl. No.: 15/258,005

(22) Filed: Sep. 7, 2016

(65) Prior Publication Data
US 2017/0076452 A1 Mar. 16, 2017

(30) Foreign Application Priority Data
Sep. 10, 2015 (JP) ................................. 2015-178553

(51) Int. Cl.
G06K 9/00 (2006.01)
G06T 7/00 (2017.01)
G06T 7/11 (2017.01)

(52) U.S. Cl.
CPC .............. *G06T 7/0014* (2013.01); *G06T 7/11* (2017.01); *G06T 2207/10084* (2013.01); *G06T 2207/10092* (2013.01); *G06T 2207/30016* (2013.01)

(58) Field of Classification Search
CPC . G06T 2207/10084; G06T 2207/10092; G06T 2207/20036; G06T 2207/30016; G06T 7/0014; G06T 7/0081
See application file for complete search history.

(56) References Cited

U.S. PATENT DOCUMENTS

| 7,834,627 B2 * | 11/2010 | Sakai | G01R 33/56341 |
|---|---|---|---|
| | | | 324/307 |
| 8,942,446 B2 * | 1/2015 | Martens | G16H 50/50 |
| | | | 382/128 |
| 9,741,114 B2 * | 8/2017 | Varkuti | G06T 7/0012 |

(Continued)

FOREIGN PATENT DOCUMENTS

| JP | 2002-360538 | 12/2002 |
|---|---|---|
| JP | 2008-289660 A | 12/2008 |

(Continued)

OTHER PUBLICATIONS

Rykhlevskaia et al. ("Combining structural and functional neuroimaging data for studying brain connectivity: A review", 2007).*

(Continued)

*Primary Examiner* — Avinash Yentrapati
(74) *Attorney, Agent, or Firm* — Oblon, McClelland, Maier & Neustadt, L.L.P.

(57) ABSTRACT

An image processing apparatus according to an embodiment includes processing circuitry. The processing circuitry acquires a magnetic resonance (MR) image in which objects of interest scattered in a brain of a subject are rendered. The processing circuitry acquires connection information indicating connectivity among a plurality of regions of the brain. The processing circuitry performs an analysis with use of the MR image and the connection information, and calculates analytical values related to the objects of interest and allocated to the regions.

16 Claims, 10 Drawing Sheets

(56) References Cited

U.S. PATENT DOCUMENTS

| | | | |
|---|---|---|---|
| 10,504,229 B2* | 12/2019 | Li | A61B 5/7425 |
| 2006/0239520 A1* | 10/2006 | Van Muiswinkel | G01R 33/56341 382/128 |
| 2009/0279762 A1* | 11/2009 | Tsukimoto | G01R 33/56341 382/131 |
| 2011/0301431 A1* | 12/2011 | Greicius | G01R 33/4806 600/300 |
| 2012/0195482 A1* | 8/2012 | Wakai | G01R 33/5608 382/128 |
| 2013/0035922 A1* | 2/2013 | Martens | G16H 50/50 703/11 |
| 2014/0276187 A1* | 9/2014 | Iasemidis | A61B 5/4076 600/544 |
| 2014/0294270 A1* | 10/2014 | Schneider | A61B 5/055 382/131 |
| 2015/0018664 A1* | 1/2015 | Pereira | A61B 5/055 600/410 |
| 2015/0119689 A1* | 4/2015 | Pascual-Leone | A61N 2/006 600/410 |
| 2015/0164431 A1* | 6/2015 | Terry | A61B 5/4094 600/408 |
| 2015/0324994 A1* | 11/2015 | Tseng | G06T 7/0014 382/128 |
| 2016/0045128 A1* | 2/2016 | Sitt | A61B 5/7246 600/409 |
| 2016/0110911 A1* | 4/2016 | Frank | A61B 5/055 382/131 |
| 2016/0284082 A1* | 9/2016 | Varkuti | G06T 7/0012 |
| 2017/0035320 A1* | 2/2017 | Verma | A61B 5/055 |
| 2017/0052241 A1* | 2/2017 | Cetingul | G01R 33/56341 |
| 2017/0309069 A1* | 10/2017 | Thomas | G06T 19/20 |
| 2017/0326377 A1* | 11/2017 | Neuvonen | A61B 5/0042 |

FOREIGN PATENT DOCUMENTS

| | | |
|---|---|---|
| JP | 2012-235934 | 12/2012 |
| JP | 2013-132363 A | 7/2013 |

OTHER PUBLICATIONS

Park et al. ("Structural and Functional Brain Networks: From Connections to Cognition", 2013).*

Rykhlevskaia, Elena, Gabriele Gratton, and Monica Fabiani. "Combining structural and functional neuroimaging data for studying brain connectivity: a review." Psychophysiology 45.2 (2008): 173-187. (Year: 2008).*

Juan Zhou, et al., "Predicting Regional Neurodegeneration from the Healthy Brain Functional Connectome", Neuron, 2012, 12 pgs.

Susumu Mori, et al., "Atlas-Based Neuroinformatics via MRI" Harnessing Information from Past Clinical Cases and Quantitative Image Analysis for Patient Care, Annual Review of Biomedical Engineering, vol. 15, 2013, 22 pgs.

Office Action dated Jan. 7, 2020 in Japanese Patent Application No. 2015-178553 (with unedited computer generated English translation), 5 pages.

Susumu Mori, et al., "White matter atlases based on diffusion tensor imaging", Curr Opin Neurol, 2009, 14 pgs.

* cited by examiner

FIG.8
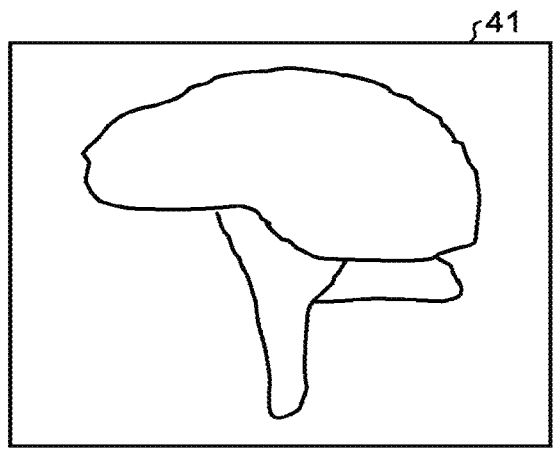
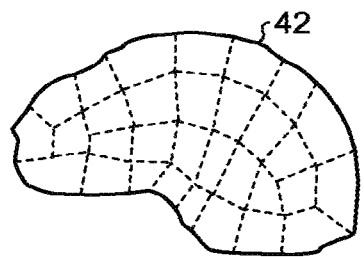
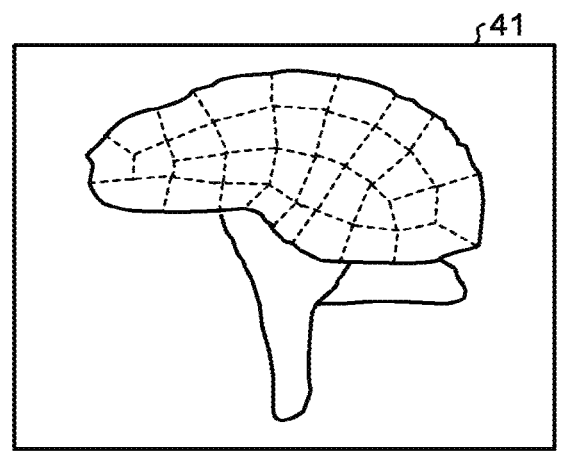
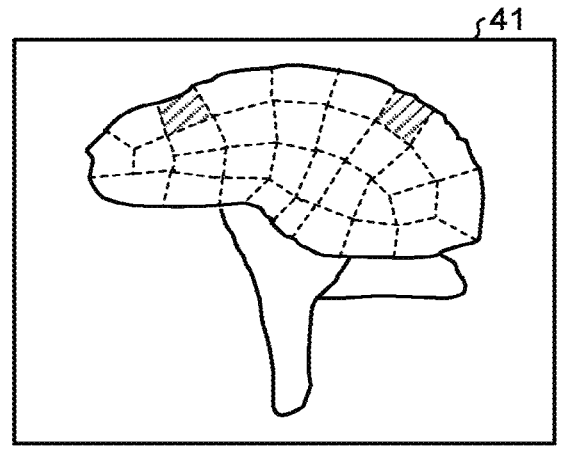

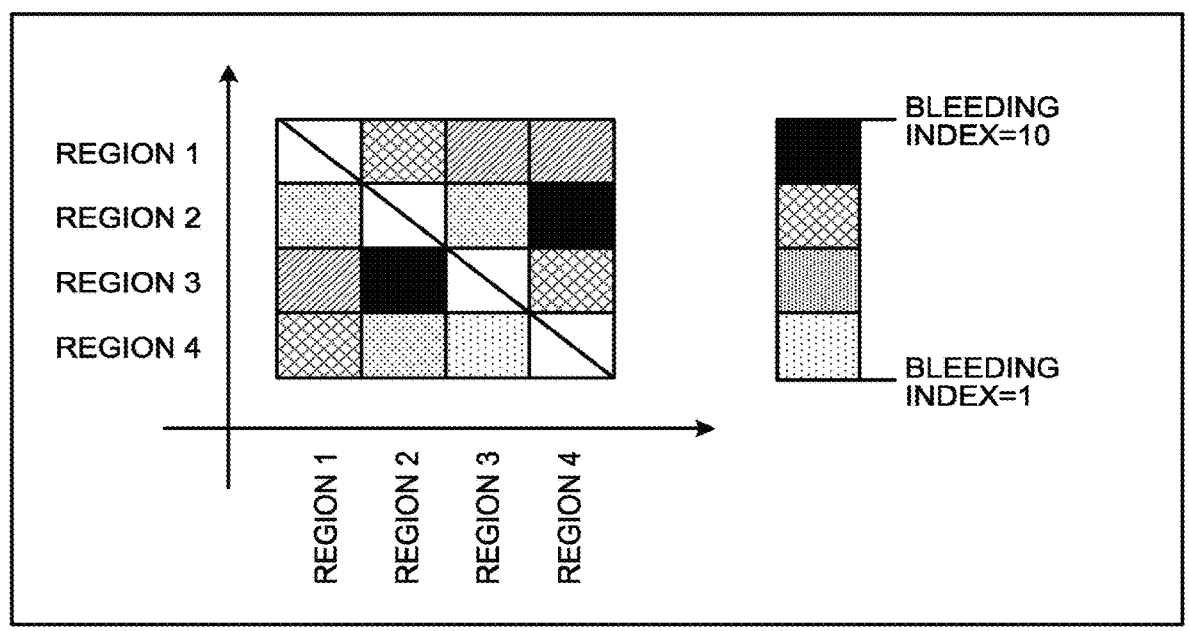

| | |
|---|---|
| FUNCTIONAL CONNECTIVITY 1 | |
| FUNCTIONAL CONNECTIVITY 2 | ✓ |
| FUNCTIONAL CONNECTIVITY 3 | |
| FUNCTIONAL CONNECTIVITY 4 | |

FIG.13
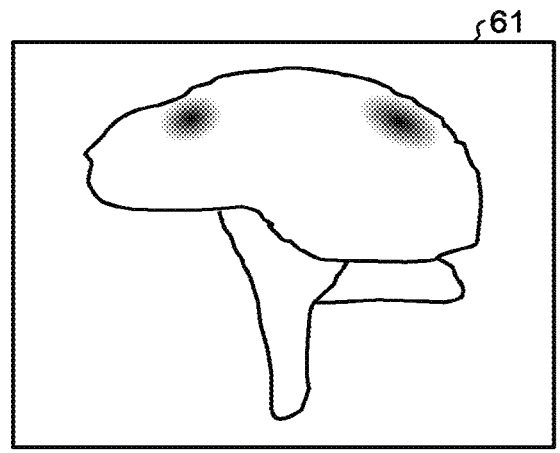
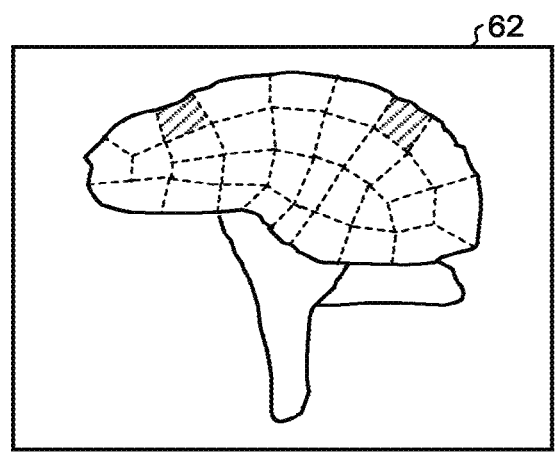
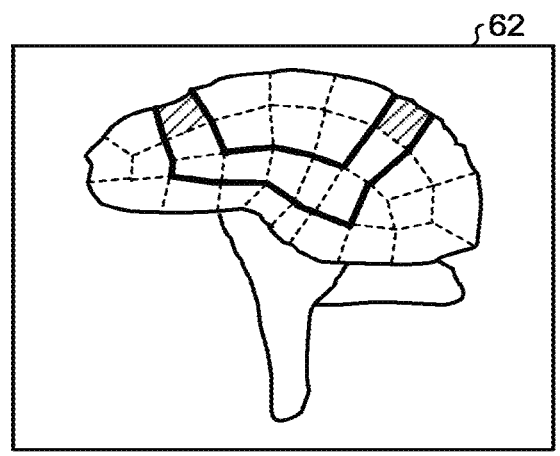

IMAGE PROCESSING APPARATUS AND MAGNETIC RESONANCE IMAGING APPARATUS

CROSS-REFERENCE TO RELATED APPLICATIONS

This application is based upon and claims the benefit of priority from Japanese Patent Application No. 2015-178553, filed on Sep. 10, 2015; the entire contents of which are incorporated herein by reference.

FIELD

Embodiments described herein relate generally to an image processing apparatus and a magnetic resonance imaging apparatus.

BACKGROUND

In recent years, studies have been actively conducted on central nervous system diseases and brain sciences using magnetic resonance imaging apparatus. For example, the need for early recognition and early treatment of dementia, including Alzheimer's disease, has been increasingly growing along with the global progress of the aging society. A magnetic resonance imaging apparatus is an essential apparatus for evaluation of central nervous systems because the magnetic resonance imaging apparatus can provide high contrast images of a wide variety of physical, scientific, and biological properties.

BRIEF DESCRIPTION OF THE DRAWINGS

FIG. 8 is a diagram illustrating an example of reception of selection operation in a first modification of the first embodiment;

FIG. 9 is a diagram illustrating an example of display of analytical values in a second modification of the first embodiment;

FIG. 10 is a diagram illustrating an example of display of analytical values in a third modification of the first embodiment;

FIG. 13 is a diagram illustrating a flow of analysis by the analysis function according to the second embodiment;

DETAILED DESCRIPTION

An image processing apparatus according to an embodiment includes processing circuitry. The processing circuitry acquires an MR image in which objects of interest scattered in a brain of a subject are rendered. The processing circuitry acquires connection information indicating connectivity among a plurality of regions of the brain. The processing circuitry performs an analysis with use of the MR image and the connection information, and calculates analytical values related to the objects of interest and allocated to the regions.

First Embodiment

Figure 1:
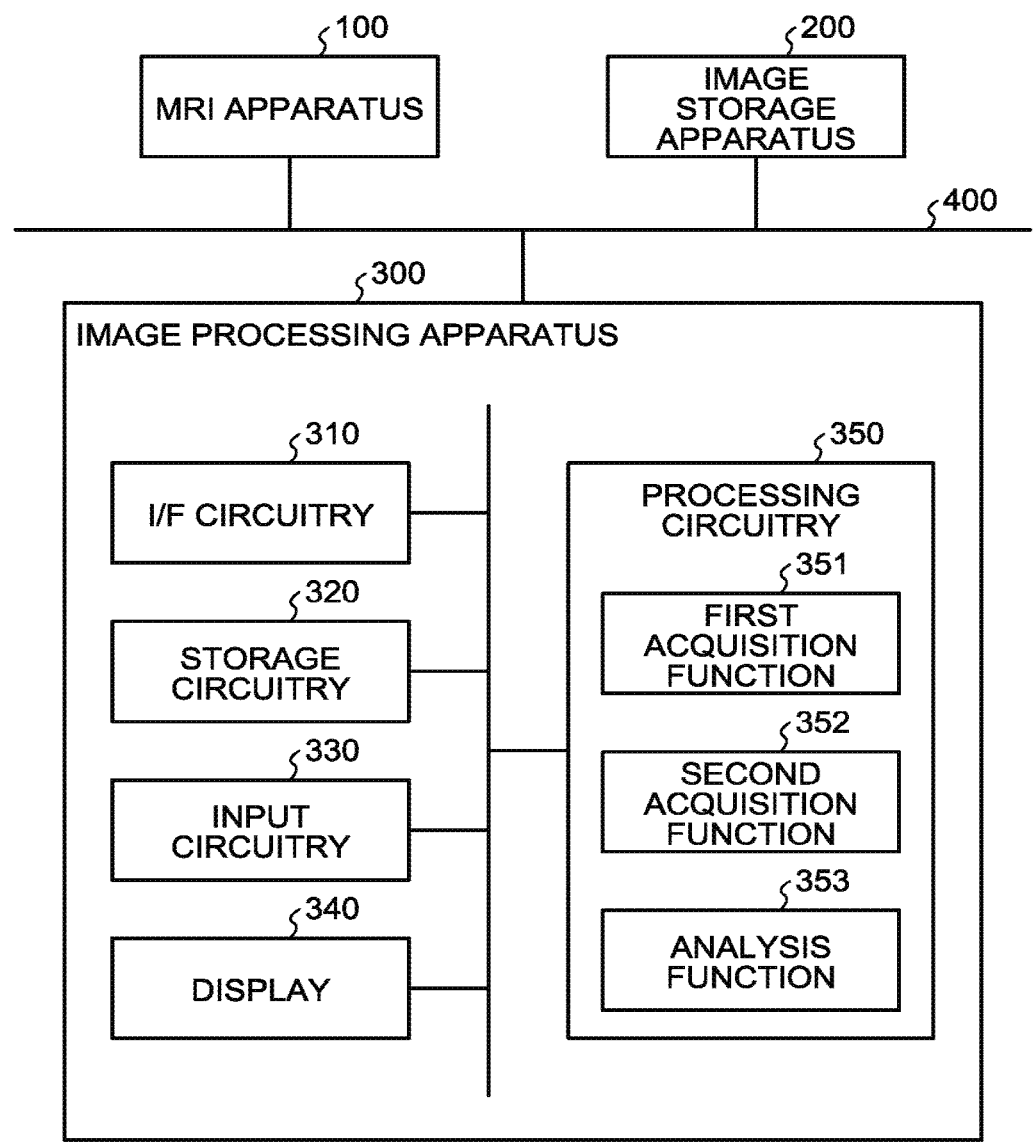
FIG. 1 is a diagram illustrating a configuration example of an image processing apparatus according to a first embodiment.

FIG. 1 is a diagram illustrating a configuration example of an image processing apparatus according to a first embodiment. For example, as illustrated in FIG. 1, an image processing apparatus 300 according to the present embodiment is connected to a magnetic resonance imaging (MRI) apparatus 100 and an image storage apparatus 200 through a network 400. Note that the image processing apparatus 300 may be further connected to other image diagnostic apparatus, such as an X-ray computed tomography (CT) apparatus, an ultrasound diagnostic apparatus, and a positron emission tomography (PET) apparatus, through the network 400.

The MRI apparatus 100 acquires image data on a subject by utilizing the magnetic resonance phenomenon. Specifically, the MRI apparatus 100 executes various kinds of imaging sequences based on imaging conditions set by an operator of the MRI apparatus 100, thereby acquiring magnetic resonance data from the subject. Then, the MRI apparatus 100 subjects the acquired magnetic resonance data to image processing such as the Fourier transform to generate two-dimensional or three-dimensional image data.

The image storage apparatus 200 stores therein image data acquired by various kinds of image diagnostic apparatus. Specifically, the image storage apparatus 200 acquires image data from the MRI apparatus 100 through the network 400, and stores the acquired image data in storage circuitry provided inside or outside the image storage apparatus 200. For example, the image storage apparatus 200 is implemented by computer equipment such as a server apparatus.

The image processing apparatus 300 processes image data acquired by various kinds of image diagnostic apparatus. Specifically, the image processing apparatus 300 acquires image data from the MRI apparatus 100 or the image storage apparatus 200 through the network 400, and stores the acquired image data in storage circuitry provided inside or outside the image processing apparatus 300. The image processing apparatus 300 subjects the acquired image data to various kinds of image processing, and displays the image data before or after the image processing on a display or other similar devices. For example, the image processing apparatus 300 is implemented by computer equipment such as a workstation.

For example, as illustrated in FIG. 1, the image processing apparatus 300 includes interface (I/F) circuitry 310, storage circuitry 320, input circuitry 330, a display 340, and processing circuitry 350.

The I/F circuitry 310 controls transmission and communication of various kinds of data to be transmitted and received between the image processing apparatus 300 and other apparatus connected through the network 400. Specifically, the I/F circuitry 310 is connected to the processing circuitry 350, and converts image data output from the processing circuitry 350 into a format compliant with a predetermined communication protocol and transmits the resultant image data to the MRI apparatus 100 or the image storage apparatus 200. The I/F circuitry 310 outputs image data received from the MRI apparatus 100 or the image storage apparatus 200 to the processing circuitry 350. For example, the I/F circuitry 310 is implemented by a network card, a network adapter, or a network interface controller (NIC).

The storage circuitry 320 stores therein various kinds of data. Specifically, the storage circuitry 320 is connected to the processing circuitry 350, and the storage circuitry 320 stores therein input image data or outputs stored image data to the processing circuitry 350 in response to a command transmitted from the processing circuitry 350. For example, the storage circuitry 320 is implemented by a semiconductor memory device, such as a random access memory (RAM) and a flash memory, a hard disk, or an optical disc.

The input circuitry 330 receives an input operation of various kinds of instructions and various kinds of information from the operator. Specifically, the input circuitry 330 is connected to the processing circuitry 350, and converts an input operation received from the operator into an electric signal and outputs the resultant signal to the processing circuitry 350. For example, the input circuitry 330 is implemented by a trackball, a switch button, a mouse, a keyboard, or a touch panel.

The display 340 displays various kinds of information and various kinds of images. Specifically, the display 340 is connected to the processing circuitry 350, and displays images in various kinds of formats based on image data output from the processing circuitry 350. For example, the display 340 is implemented by a liquid crystal monitor, a cathode ray tube (CRT) monitor, or a touch panel.

The processing circuitry 350 controls each component included in the image processing apparatus 300 based on an input operation received from the operator through the input circuitry 330. Specifically, the processing circuitry 350 controls the storage circuitry 320 to store therein image data output from the I/F circuitry 310. The processing circuitry 350 controls the display 340 to display image data read from the storage circuitry 320. For example, the processing circuitry 350 is implemented by a processor.

For example, the image processing apparatus 300 according to the present embodiment with the configuration described above is operated by a doctor and is used for analysis of features related to the central nervous network.

In recent years, studies have been actively conducted on central nervous system diseases and brain sciences using MRI apparatus. For example, the need for early recognition and early treatment of dementia, including Alzheimer's disease, has been increasingly growing along with the global progress of the aging society. An MRI apparatus is now an essential apparatus for evaluation of central nervous systems because the MRI apparatus can provide high contrast images of a wide variety of physical, scientific, and biological properties. In particular, diffusion tensor tractography (DTT) and resting-state functional MRI (rs-fMRI) have attracted much attention as methods for rendering structural or functional connectivity among regions of the brain.

DTT is a method for tracking nerve fibers from a diffusion tensor imaging (DTI) image and generating a DTT image in which the traces of tracking are rendered. The tracked traces are represented as lines connecting one partial region of the brain to another or lines connecting from a partial region of the brain to peripheral nerves. A diffusion tensor image represents diffusion anisotropy. Anisotropy itself is considered to reflect the central nervous structure containing water molecules, and the traces in the DTT image are interpreted as representing structural connectivity between ends thereof. Representative examples of the ends include a gyrus. Furthermore, identification of white matter regions is conducted with use of connectivity information.

Rs-fMRI is one method of fMRI using blood oxygenation level dependent (BOLD), and involves BOLD imaging without giving a particular stimulus or task to a subject, thereby taking a correlation among regions of the brain based on signal intensity changes. With rs-fMRI, an rs-fMRI image representing a correlation among regions of the brain is obtained. Regions with a high correlation are interpreted as having functional connectivity. Examples of methods that can be used to display the results of rs-fMRI include statistical parametric mapping in which the levels of correlation are color coded. Other examples of the methods for obtaining functional connectivity include fMRI and arterial spin labeling (ASL) involving giving tasks.

For dementia, including Alzheimer's disease, other kinds of MRI images (for example, T1 weighted image, T2* weighted image, susceptibility weighted image, fluid attenuation inversion recovery (FLAIR) image, diffusion weighted imaging (DWI) image, and DTI image) are acquired as well, and anatomical features of the brain are used for diagnosis. A T2* weighted image can grasp abnormal sites such as brain hemorrhage and microbleeds. A FLAIR image and a DWI image can render sites where infarction occurs. The states of sites in the brain can be recognized with use of these kinds of images.

As described above, the use of MRI apparatus can obtain an image representing an anatomical structure in the brain, an image representing structural connectivity, and an image representing functional connectivity for each individual.

In general, however, there is no other way but to rely on visual checks in order to grasp the state of disease or cognitive function by referring to these images by mutual comparison. There is no available quantitative comparison method, and hence the use of MRI apparatus has not advanced for recognition of the degree of correspondence to disease and future forecast.

In view of the foregoing, the image processing apparatus 300 according to the present embodiment is configured to analyze objects of interest scattered in the brain in a manner that the objects of interest are associated with connectivity among regions of the brain.

Specifically, the processing circuitry 350 has a first acquisition function 351, a second acquisition function 352, and an analysis function 353. Note that the processing circuitry 350 is an example of a processing circuitry recited in the claims.

The first acquisition function 351 acquires an MR image in which objects of interest scattered in the brain of the subject are rendered. The second acquisition function 352 acquires connection information indicating connectivity among a plurality of regions of the brain. The analysis function 353 analyzes the objects of interest with use of the MR image acquired by the first acquisition function 351 and the connection information acquired by the second acquisition function 352, and calculates analytical values related to the objects of interest, which are allocated to the regions of the brain.

The objects of interest as used herein are, for example, brain hemorrhage, microbleeds, inflammation, and edema. For example, in the above-mentioned MR image such as a T2* weighted image, brain hemorrhages and microbleeds are rendered as black spots, and inflammation and edema are rendered as white spots.

The first acquisition function 351 acquires an MR image in which tissue properties of the brain of the subject are rendered. Specifically, the first acquisition function 351 acquires an MR image of an analysis target from the MRI apparatus 100 or the image storage apparatus 200 through the network 400, and stores the acquired MR image in the storage circuitry 320. For example, the first acquisition function 351 acquires a T1 weighted image, a T2* weighted image, a susceptibility weighted image, a quantitative susceptibility map, a FLAIR image, a DWI image, or a DTI image as an MR image.

In the present embodiment, the first acquisition function 351 acquires a T2* weighted image. Specifically, the first acquisition function 351 acquires a T2* weighted image of an analysis target from the MRI apparatus 100 or the image storage apparatus 200. The first acquisition function 351 may acquire magnetic resonance data acquired by a pulse sequence for acquired T2* weighted images, and generate a T2* weighted image based on the acquired magnetic resonance data. The first acquisition function 351 may acquire a susceptibility weighted image instead of a T2* weighted image.

Figure 2:
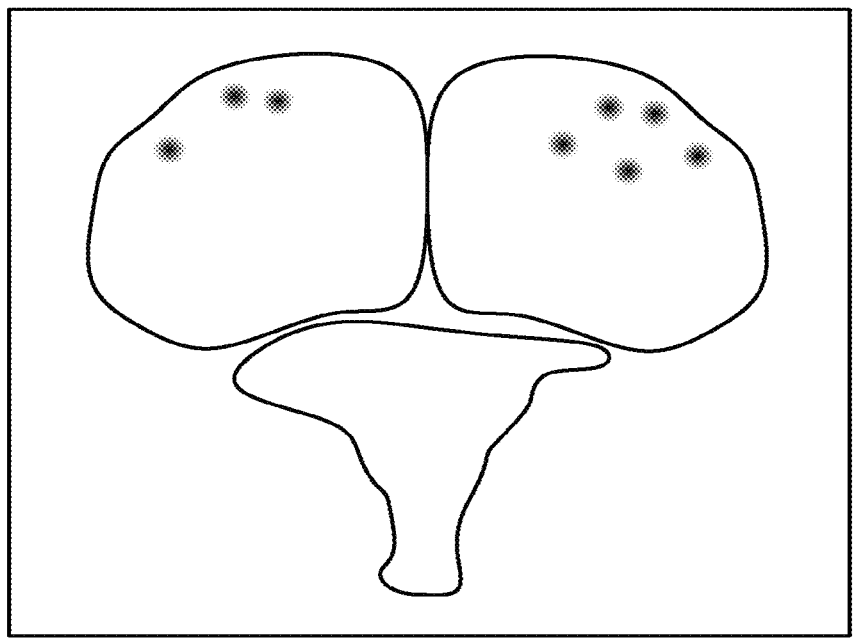
FIGS. 2 and 3 are schematic diagrams illustrating examples of T2* weighted images acquired by a first acquisition function according to the first embodiment.
Figure 3:
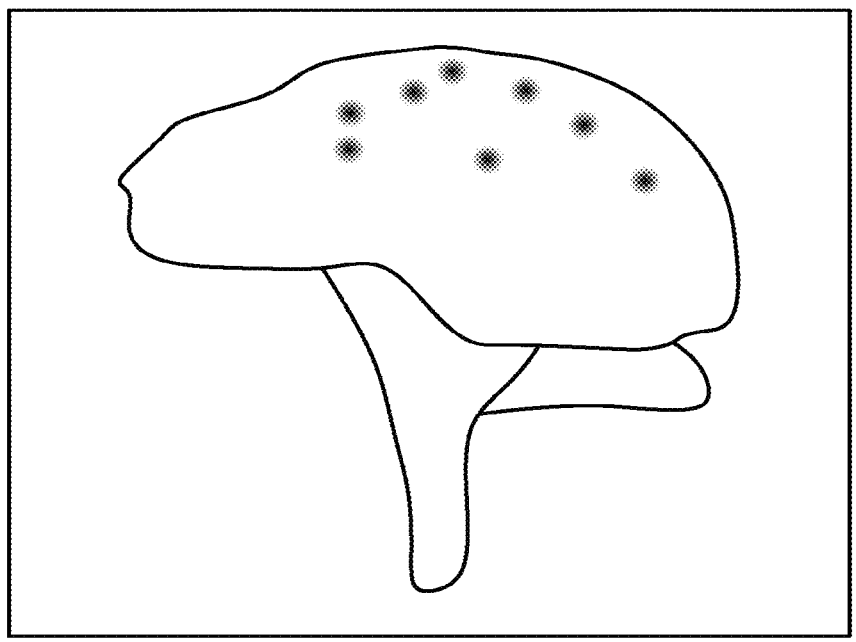

FIGS. 2 and 3 are schematic diagrams illustrating examples of T2* weighted images acquired by the first acquisition function 351 according to the first embodiment. FIG. 2 illustrates a T2* weighted image acquired when projected from the front of the head by minimum intensity projection, and FIG. 3 illustrates a T2* weighted image acquired when projected from the side of the head by minimum intensity projection. In FIGS. 2 and 3, black spots represent microbleeds, where signal reduced spots are considered to be generated due to magnetic field heterogeneity caused by hemosiderin. Microbleeds can exist on either the surface of the brain or a deep part of the brain.

The second acquisition function 352 acquires connection information indicating connectivity among a plurality of regions defined by functionally or anatomically segmenting the brain. Specifically, the second acquisition function 352 acquires connection information from the MRI apparatus 100 or the image storage apparatus 200 through the network 400, and stores the acquired connection information in the storage circuitry 320.

Note that the second acquisition function 352 acquires connection information that is obtained from the same subject as that for the MR image acquired by the first acquisition function 351. The second acquisition function 352 acquires connection information that is obtained from another protocol executed in the same examination as that of the protocol for acquiring MR images acquired by the first acquisition function 351.

In the present embodiment, the second acquisition function 352 acquires connection information indicating structural connectivity related to a plurality of regions defined by functionally or anatomically segmenting the brain.

In the present embodiment, the second acquisition function 352 acquires, as connection information, a DTI image in which nerve fibers of the brain are rendered. Specifically, the second acquisition function 352 acquires, from the MRI apparatus 100 or the image storage apparatus 200, a DTI image that is obtained from the same subject in the same examination as those for the T2* weighted image acquired by the first acquisition function 351. Then, the second acquisition function 352 tracks the nerve fibers from the acquired DTI image to generate a DTT image. Note that the second acquisition function 352 may directly acquire a DTT image in the case where the MRI apparatus 100 or the image storage apparatus 200 has generated a DTT image. The second acquisition function 352 may acquire a DWI image, generate a DTI image based on the acquired DWI image, and generate a DTT image based on the generated DTI image. The second acquisition function 352 may acquire magnetic resonance data acquired by a pulse sequence for acquiring DWI images, and generate a DWI image, a DTI image, and a DTT image based on the acquired magnetic resonance data.

Figure 4:
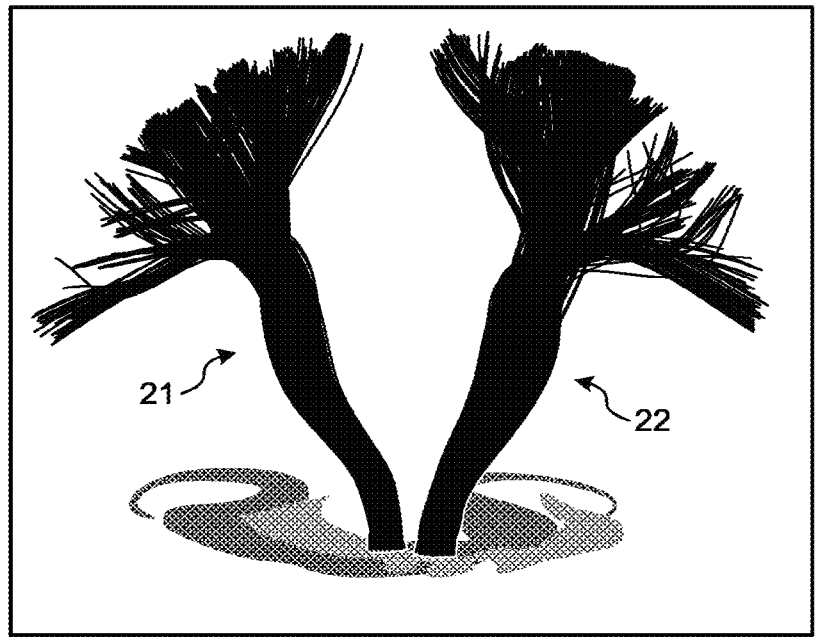
FIG. 4 is a schematic diagram illustrating an example of a DTT image acquired by a second acquisition function according to the first embodiment.

FIG. 4 is a schematic diagram illustrating an example of a DTT image acquired by the second acquisition function 352 according to the first embodiment. FIG. 4 illustrates a DTT image of the same subject obtained by the same examination as in the case of the T2* weighted images illustrated in FIGS. 2 and 3. Note that, FIG. 4 mainly illustrates nerve fibers extending from a medullary part to reach a cortical region, but in practice, there are nerve fibers connected from one cortical region to another cortical region. For example, a group of nerve fibers 21 illustrated in FIG. 4 extend from the medullary part to reach a cortical region in the right hemisphere of the brain, and the traces of the group of nerve fibers 21 indicate connectivity between the cortical region and the white matter region that are included in the right hemisphere. For example, a group of nerve fibers 22 illustrated in FIG. 4 extend from the medullary part to reach a cortical region in the left hemisphere of the brain, and the traces of the group of nerve fibers 22 indicate connectivity between the cortical region and the white matter region that are included in the left hemisphere.

The analysis function 353 performs an analysis with use of an MR image acquired by the first acquisition function 351 and connection information acquired by the second acquisition function 352, and displays analytical results allocated to a plurality of regions defined by functionally or anatomically segmenting the brain. Specifically, the analysis function 353 reads an MR image acquired by the first acquisition function 351 and connection information acquired by the second acquisition function 352 from the storage circuitry 320, performs an analysis with use of the read MR image and connection information, and displays analytical results.

Note that the analysis function 353 performs an analysis with use of connection information that is obtained from the same subject as that for the MR image acquired by the first acquisition function 351. The analysis function 353 performs an analysis with use of connection information that is obtained from another protocol executed in the same examination as that of the protocol for acquiring MR images acquired by the first acquisition function 351.

In the present embodiment, the analysis function 353 performs an analysis with use of connection information indicating structural connectivity about a plurality of regions of the brain.

In the present embodiment, the analysis function 353 performs an analysis with use of, as connection information, a DTT image in which nerve fibers of the brain are rendered.

Specifically, the analysis function 353 displays the DTT image acquired by the second acquisition function 352 on the display 340, and receives an operation of selecting a specific group of nerve fibers from among the groups of nerve fibers rendered in the DTT image through the input circuitry 330 from the operator.

Figure 5:
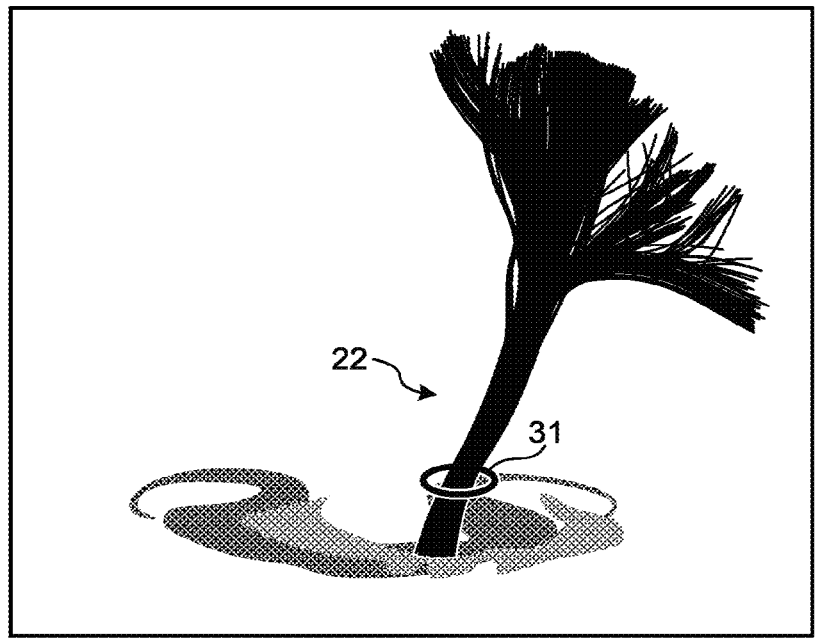
FIG. 5 is a diagram illustrating an example of reception of selection operation by an analysis function according to the first embodiment.

FIG. 5 is a diagram illustrating an example of reception of selection operation by the analysis function 353 according to the first embodiment. A description is now given of an example where the DTT image illustrated in FIG. 4 is used. For example, as illustrated in FIG. 5, the analysis function 353 displays a region of interest (ROI) 31 on the DTT image displayed on the display 340. The ROI 31 as used herein is a graphic that can be disposed at a desired position on the DTT image by the operator through the input circuitry 330. A group of nerve fibers at the position where the ROI 31 is disposed are selected. Note that, in the example illustrated in FIG. 5, only the selected group of nerve fibers is displayed and unselected groups of nerve fibers are hidden. However, unselected groups of nerve fibers may be displayed instead.

The analysis function 353 analyzes the T2* weighted image data acquired by the first acquisition function 351 based on the selected group of nerve fibers, thereby extracting microbleeding regions related to the regions connected to the selected group of nerve fibers.

For example, the analysis function 353 extracts, from the T2* weighted image, microbleeding regions positioned in the vicinity of the selected group of nerve fibers. When the group of nerve fibers is selected by the operator, the analysis function 353 acquires, based on DTT image data, positional information indicating a path through which the selected group of nerve fibers pass. Based on the positional information acquired from the DTT image data, the analysis function 353 specifies a path corresponding to the selected group of nerve fibers on the T2* weighted image data. Then, the analysis function 353 analyzes the T2* weighted image data to extract a microbleeding region that is away from the specified path at a distance within a predetermined range. In this process, for example, the analysis function 353 performs template matching or determines an image spatial derivative, thereby extracting spots with signal values that are equal to or less than a predetermined threshold as microbleeding regions.

After that, the analysis function 353 changes the display form of the regions allocated with the analytical results in the MR image displayed on the display 340 in accordance with the analytical results. For example, the analysis function 353 selectively displays only the microbleeding regions related to the regions connected to the selected group of nerve fibers among the microbleeding regions rendered in the T2* weighted image displayed on the display 340.

Figure 6:
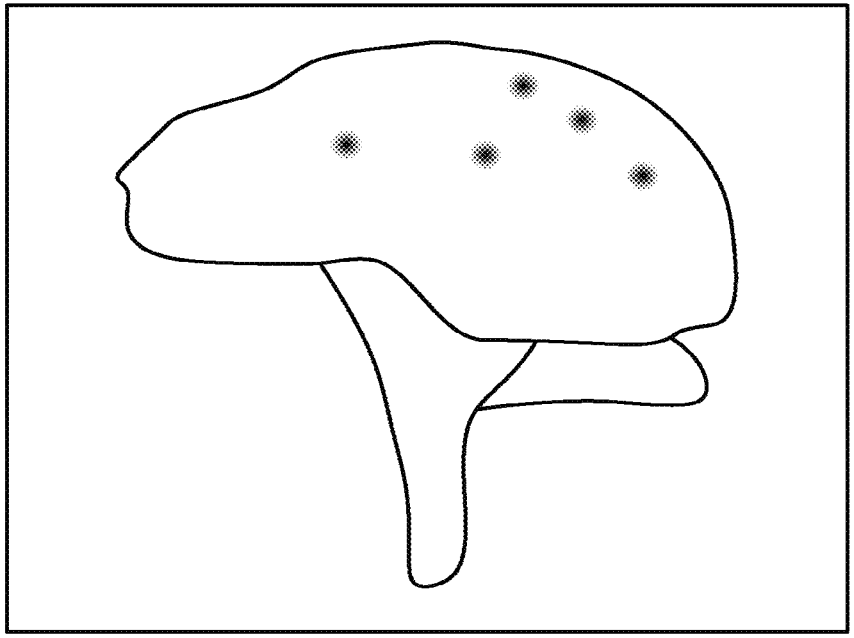
FIG. 6 is a diagram illustrating an example of display of analytical results by the analysis function according to the first embodiment.

FIG. 6 is a diagram illustrating an example of display of analytical results by the analysis function 353 according to the first embodiment. A description is now given of an example where the DTT image illustrated in FIG. 4 and the T2* weighted image illustrated in FIG. 3 are used. For example, the analysis function 353 displays a T2* weighted image acquired by the first acquisition function 351 on the display 340. In this case, for example, as illustrated in FIG. 3, eight microbleeding regions are displayed on the T2* weighted image. Then, for example, when a group of nerve fibers 22 are selected on the DTT image by the operator, the analysis function 353 changes the display forms of cortical region and white matter region that are connected to the group of nerve fibers 22 so that only the extracted microbleeds are displayed among microbleeds rendered in the T2* weighted image. In this manner, for example, as illustrated in FIG. 6, five microbleeding regions are selectively displayed on the T2* weighted image.

A description has been given of the first acquisition function 351, the second acquisition function 352, and the analysis function 353 included in the processing circuitry 350. These processing functions are stored in the storage circuitry 320 in the form of, for example, computer programs that can be executed by a computer. The processing circuitry 350 reads each computer program from the storage circuitry 320 and executes the read computer program, thereby implementing the processing function corresponding to each computer program. In other words, the processing circuitry 350 that has read each program has each processing function illustrated in FIG. 1.

Note that, in FIG. 1, a description has been given of an example where the processing functions of the first acquisition function 351, the second acquisition function 352, and the analysis function 353 are implemented by the single processing circuitry 350, but the embodiments are not limited thereto. For example, the processing circuitry 350 may be formed by a combination of independent processors, and the processing functions may be implemented by each processor executing each computer program. The processing functions included in the processing circuitry 350 may be implemented as being appropriately distributed or integrated in a single or plurality of processing circuits.

Figure 7:
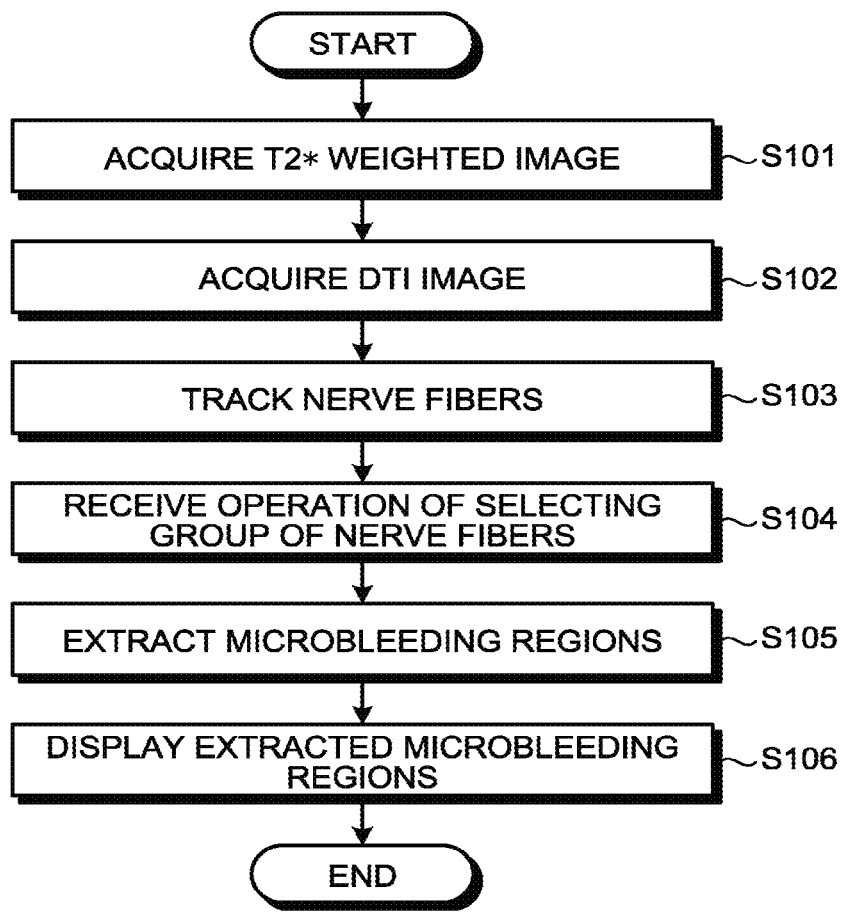
FIG. 7 is a flowchart illustrating a processing procedure of image processing by the image processing apparatus according to the first embodiment.

FIG. 7 is a flowchart illustrating a processing procedure of image processing by the image processing apparatus 300 according to the first embodiment. For example, as illustrated in FIG. 7, in the image processing apparatus 300 according to the present embodiment, the first acquisition function 351 acquires a T2* weighted image (Step S101). Step S101 is implemented by, for example, the processing circuitry 350 invoking a predetermined computer program corresponding to the first acquisition function 351 from the storage circuitry 320 and executing the computer program.

Subsequently, the second acquisition function 352 acquires a DTI image that is obtained from the same subject in the same examination as those for the T2* weighted image acquired by the first acquisition function 351 (Step S102). The second acquisition function 352 tracks nerve fibers from the DTI image to generate a DTT image (Step S103). Steps S102 and S103 are implemented by, for example, the processing circuitry 350 invoking a predetermined computer program corresponding to the second acquisition function 352 from the storage circuitry 320 and executing the computer program.

After that, the analysis function 353 receives from the operator an operation of selecting, on the DTT image displayed on the display 340, a specific group of nerve fibers from among the groups of nerve fibers rendered in the DTT image (Step S104). The analysis function 353 analyzes T2* weighted image data to extract microbleeding regions relating to regions connected to the selected group of nerve fibers (Step S105). Then, the analysis function 353 displays the extracted microbleeding regions (Step S106). Steps S104 to S106 are implemented by, for example, the processing circuitry 350 invoking a predetermined computer program corresponding to the analysis function 353 from the storage circuitry 320 and executing the computer program.

Note that, in FIG. 7, the execution order of the processing of acquiring a T2* weighted image by the first acquisition function 351 (Step S101) and the processing of acquiring a DTI image to generate a DTT image by the second acquisition function 352 (Steps S102 and S103) may be reversed.

As described above, according to the first embodiment, an MR image in which tissue properties of the brain are rendered is analyzed based on connection information indicating structural connectivity among regions of the brain, thereby enabling the relation between the structural connectivity among regions of the brain and morphological information on microbleeds in the MR image to be clearly presented as an image.

In general, for example, in diagnosis using a 12* weighted image and a DTT image, a radiologist visually observes the images independently. According to the first embodiment, the T2* weighted image and the DTT image are integrated and processed as information to be displayed, which can reduce time and effort for diagnosis. Furthermore, the accuracy of diagnosis can be improved.

From the foregoing, the first embodiment enables objects of interest scattered in the brain to be analyzed in association with connectivity among regions of the brain. Furthermore, the first embodiment enables characteristic microlesional regions displayed on a brain image to be analyzed in association with connectivity among regions of the brain.

First Modification of First Embodiment

Note that, in the above description, the analysis function 353 receives an operation of selecting a specific group of nerve fibers from among the groups of nerve fibers rendered in a DTT image, but the embodiments are not limited thereto. For example, the analysis function 353 may receive an operation of selecting a specific region from among a plurality of regions defined by functionally or anatomically segmenting the brain.

In this case, the first acquisition function 351 further acquires a brain morphological image acquired in the same examination as that for the MR image of the analysis target. For example, the first acquisition function 351 acquires a T1 weighted image as a morphological image.

The analysis function 353 segments the region of the brain rendered in the morphological image acquired by the first acquisition function 351 into a plurality of regions with use of a model indicating structural connectivity about a plurality of regions defined by functionally or anatomically segmenting a standard brain. For example, the regions as used herein include a cortical region and a white matter region.

FIG. 8 is a diagram illustrating an example of reception of selection operation in the first modification of the first embodiment. For example, as illustrated in the upper part of FIG. 8, the analysis function 353 deforms a model 42 for co-registration with a morphological image 41, thereby segmenting the region of the brain rendered in the morphological image 41 into a plurality of regions. For example, as illustrated in the middle part of FIG. 8, the analysis function 353 displays the morphological image 41, which has superimposed thereon information indicating the segmented regions, on the display 340. Then, for example, as illustrated in the lower part of FIG. 8, the analysis function 353 receives an operation of selecting specific regions from among the regions displayed on the morphological image 41 through the input circuitry 330. Note that, in the lower part of FIG. 8, the regions selected on the morphological image 41 are hatched.

After the regions are selected by the operator, the analysis function 353 acquires positional information on the selected regions based on data on the morphological image 41. Based on the positional information acquired from the data on the morphological image 41, the analysis function 353 specifies a group of nerve fibers connected to the selected regions in DTT image data. By the same method as in the above-mentioned first embodiment, the analysis function 353 analyzes T2* weighted image data acquired by the first acquisition function 351 based on the group of nerve fibers specified on the morphological image 41, thereby extracting microbleeding regions related to regions connected to the selected group of nerve fibers.

As described above, in the first modification, the analysis function 353 allows a cortical region itself to be selected so that nerve fibers connected to a specific brain cortical region, a gyrus, or a lobe are selected, or the analysis function 353 allows a white matter region segmented based on connectivity of nerve fibers to be selected. This method corresponds to indirect selection of a group of nerve fibers through selection of the region of the brain. In this case, the method of extracting microbleeding regions involves extracting signal reduced spots included in the vicinity of the selected cortical region, or extracting microbleeding regions based on a tract of a group of nerve fibers corresponding to the segmented white matter region.

Second Modification of First Embodiment

In the above-mentioned first embodiment, a description has been given of an example where the analysis function 353 selectively displays microbleeding regions as analytical results, but the embodiments are not limited thereto. For example, the analysis function 353 may calculate an analytical value with use of an MR image and connection information, and display the calculated analytical value as an index for diagnosing the brain. Note that, in this case, the analysis function 353 may display the analytical value in addition to the display of microbleeding regions, or may display only the analytical value without displaying a microbleeding region.

In this case, the analysis function 353 calculates analytical values allocated to a plurality of regions defined by functionally or anatomically segmenting the brain with use of an MR image acquired by the first acquisition function 351 and connection information acquired by the second acquisition function 352.

Specifically, similarly to the above-mentioned embodiment, the analysis function 353 analyzes T2* weighted image data acquired by the first acquisition function 351 based on a group of nerve fibers selected by the operator, thereby extracting microbleeding regions related to the regions connected to the selected group of nerve fibers. Then, the analysis function 353 calculates an analytical value about the extracted microbleeding regions. For example, the analysis function 353 calculates the number of the extracted microbleeding regions as an analytical value. For example, the analysis function 353 may calculate a total value of the volumes of the extracted microbleeds as an analytical value.

After that, the analysis function 353 displays the calculated analytical value on the display 340. Specifically, the analysis function 353 displays information indicating the selected group of nerve fibers and the analytical value allocated to the regions connected to the group of nerve fibers in association with each other.

FIG. 9 is a diagram illustrating an example of display of analytical values in the second modification of the first embodiment. For example, as illustrated in FIG. 9, the analysis function 353 displays information indicating a group of nerve fibers selected by the operator, and the calculated number of microbleeding regions, on the display 340 in a list format. Note that the analysis function 353 may weight the calculated number of microbleeding regions based on how close the microbleeding regions are to the selected group of nerve fibers. For example, the analysis function 353 may change the level of weighting depending on properties of a path of the group of nerve fibers. In this case, for example, the analysis function 353 changes the level of weighting depending on whether the path of the group of nerve fibers is included in a medullary region or a cortical region.

Third Modification of First Embodiment

In the above-mentioned second modification, a description has been given of an example where the analysis function 353 displays information indicating a selected group of nerve fibers and an analytical value allocated to regions connected to the selected group of nerve fibers in a list format, but the embodiments are not limited thereto. For example, the analysis function 353 may display analytical values in the format of a correlation diagram for regions of the brain.

For example, the analysis function 353 performs such control that a matrix indicating a connection relation among a plurality of regions of the brain is displayed on the display 340, and performs such control that analytical results are displayed in a corresponding cell in the matrix.

The analysis function 353 distinguishes between connection information in the direction from the first region to the second region and connection information in the direction from the second region to the first region, and calculates an analytical value corresponding to each of the directions.

The analysis function 353 distinguishes between the direction from the first region to the second region and the direction from the second region to the first region, and performs such control that an analytical value calculated correspondingly to each of the directions is displayed in a corresponding cell in the matrix.

In this case, the analysis function 353 displays analytical results for each combination of regions having a connection relation. For example, the analysis function 353 calculates a bleeding index, which represents the degree of bleeding, for each combination of two regions in regard to regions of the brain. In this process, for example, the analysis function 353 uses the method described above in the first embodiment to extract microbleeding regions from a T2* weighted image and calculates a bleeding index depending on the number of the extracted microbleeding regions. For example, the analysis function 353 calculates a bleeding index with a value that becomes larger as the number of microbleeds becomes larger.

FIG. 10 is a diagram illustrating an example of display of analytical values in the third modification of the first embodiment. For example, as illustrated in FIG. 10, the analysis function 353 displays tile (quadrangular) graphics side by side along the two-dimensional directions in the vertical axis and the horizontal axis for each combination of two regions in regard to the region 1, the region 2, the region 3, and the region 4. In this process, the analysis function 353 displays each graphic in color depending on the value of the bleeding index. For example, the bleeding indices are represented by numerical values of 1 to 10, and are allocated with different colors depending on the magnitude of numerical values. In this manner, the correlation among regions is displayed.

Note that, for example, as illustrated in FIG. 10, the analysis function 353 displays respective bleeding indices for two combinations of two different regions in a combination of the horizontal and vertical axes and in a combination of the vertical and horizontal axes. Specifically, in the case where a combination of regions is represented by "horizontal axis" and "vertical axis", for example, the analysis function 353 displays a bleeding index for each of a combination of "region 2" and "region 3" and a combination of "region 3" and "region 2". Note that the analysis function 353 does not display a bleeding index for a combination of the same regions, such as a combination of the region 1 and the region 1 and a combination of the region 2 and the region 2.

For example, the analysis function 353 weights respective bleeding indices for two combinations of two different regions depending on the position of microbleeds in the two regions. For example, the analysis function 353 weights respective bleeding indices for two combinations of two different regions depending on whether a microbleeding region is closer to one of the two regions or another.

Figures 11, 12:
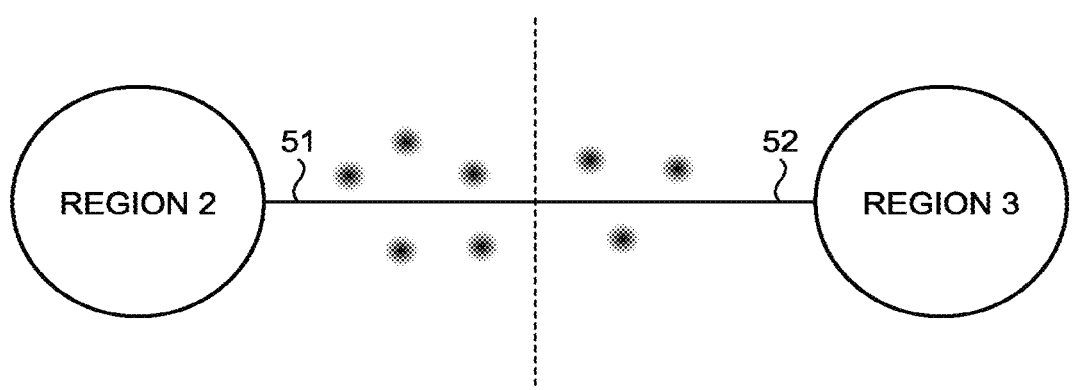
FIG. 11 is a diagram illustrating an example of weighting of analytical values in the third modification of the first embodiment.
FIG. 12 is a diagram illustrating an example of reception of selection operation by an analysis function according to a second embodiment.

FIG. 11 is a diagram illustrating an example of weighting of analytical values in the third modification of the first embodiment. Note that FIG. 11 conceptually illustrates the region 2, the region 3, and a group of nerve fibers connecting the region 2 and the region 3 as an example. In FIG. 11, the left circular region indicates the region 2, the right circular region indicates the region 3, and the straight line connecting the right and left regions indicates the group of nerve fibers connecting the region 2 and the region 3.

For example, the analysis function 353 divides the group of nerve fibers connecting the region 2 and the region 3 into a group of nerve fibers 51 closer to the region 2 and a group of nerve fibers 52 closer to the region 3 at the position at equal distances from the region 2 and the region 3. Then, the analysis function 353 calculates a bleeding index for a combination of "region 2" and "region 3" based on the number of microbleeds in the vicinity of the group of nerve fibers 51, and calculates a bleeding index for a combination of "region 3" and "region 2" based on the number of microbleeds in the vicinity of the group of nerve fibers 52.

According to the above-mentioned second and third modifications, in the case where structural connectivity among regions of the brain is further defined as a correlation index having connection direction dependency, an MR image in which tissue properties of the brain are rendered is analyzed based on connection information indicating the correlativity, whereby the relation between structural connectivity among regions of the brain and microbleeding morphological information on the MR image is clearly presented as analytical values.

Second Embodiment

In the above-mentioned first embodiment and modifications, a description has been given of an example where the analysis function 353 performs an analysis with use of connection information indicating structural connectivity about a plurality of regions of the brain, but the embodiments are not limited thereto. For example, the analysis function 353 may perform an analysis with use of connection information indicating functional connectivity about a plurality of regions of the brain. This case is now described as a second embodiment. Note that an image processing apparatus according to the second embodiment has basically the same configuration as that illustrated in FIG. 1. Therefore, the differences from the first embodiment are mainly described below.

In the present embodiment, similarly to the first embodiment, the first acquisition function 351 acquires a T2* weighted image as an MR image in which tissue properties of the brain of the subject are rendered. Note that the first acquisition function 351 may acquire a susceptibility weighted image instead of a T2* weighted image.

In the present embodiment, the first acquisition function 351 further acquires morphological images acquired in the same examination as that for the MR image of the analysis target. For example, the first acquisition function 351 acquires, as morphological images, T1 weighted images acquired in the same examination as that for the T2* weighted image of the analysis target.

In the present embodiment, the second acquisition function 352 acquires connection information indicating functional connectivity about a plurality of regions defined by functionally or anatomically segmenting the brain.

In the present embodiment, the second acquisition function 352 acquires an rs-fMRI image representing a correlation among regions of the brain as connection information. Specifically, the second acquisition function 352 acquires, from the MRI apparatus 100 or the image storage apparatus 200, an rs-fMRI image that is obtained from the same subject in the same examination as those for the T2* weighted image acquired by the first acquisition function 351. Note that the second acquisition function 352 may acquire magnetic resonance data acquired by a pulse sequence for acquiring rs-fMRI images, and generate an rs-fMRI image based on the acquired magnetic resonance data.

Then, in the present embodiment, the analysis function 353 performs an analysis with use of connection information indicating functional connectivity about a plurality of regions of the brain.

In the present embodiment, the analysis function 353 performs an analysis with use of, as connection information, an rs-fMRI image representing a correlation among regions of the brain, which is acquired by the second acquisition function 352.

Specifically, the analysis function 353 analyzes regions that are displayed to have a correlation on the rs-fMRI image with use of an rs-fMRI image and a model indicating structural connectivity about a plurality of regions defined by functionally or anatomically segmenting a standard brain. Note that the model as used herein contains information indicating structural connectivity among a plurality of regions obtained by analyzing, for example, a DTT image of a standard brain in advance in regard to regions of the brain. The analysis function 353 specifies structural connectivity among regions by deforming the model for co-registration with the morphological images of the brain acquired in the same examination as a protocol for acquiring MR images acquired by the first acquisition function 351.

For example, the analysis function 353 analyzes an rs-fMRI image to calculate the degree of correlation among regions for each combination of regions corresponding to the two or more predetermined functional connectivities. Then, based on the degree of correlation calculated for each functional connectivity, the analysis function 353 specifies a functional connectivity having a degree of correlation higher than a predetermined threshold. Note that the functional connectivity as used herein is connectivity defined for each function of the brain, such as a vision-related function, a hearing-related function, and a language-related function. Regions correlated to each function are defined in advance for each functional connectivity.

After that, for example, the analysis function 353 displays, on the display 340, information indicating functional connectivities that are specified to have high degrees of correlation based on the rs-fMRI image, and receives an operation of selecting a specific functional connectivity from among the displayed functional connectivities from the operator.

FIG. 12 is a diagram illustrating an example of reception of selection operation by the analysis function 353 according to the second embodiment. For example, as illustrated in FIG. 12, the analysis function 353 displays, on the display 340, a graphical user interface (GUI) in a list format in which pieces of information indicating the types of functional connectivities and checkboxes are associated with each other for two or more functional connectivities specified based on the rs-fMRI image. When the operator performs an operation of checking a checkbox through the input circuitry 330 on this screen, a functional connectivity corresponding to the checked checkbox is selected. Note that FIG. 12 illustrates an example where one functional connectivity is selected, but two or more functional connectivities may be selected.

Based on the selected functional connectivity, the analysis function 353 analyzes T2* weighted image data acquired by the first acquisition function 351, thereby extracting microbleeding regions related to regions corresponding to the selected functional connectivity.

FIG. 13 is a diagram illustrating a flow of analysis by the analysis function 353 according to the second embodiment. For example, as illustrated in the upper part of FIG. 13, the analysis function 353 specifies, on an rs-fMRI image 61, regions corresponding to a functional connectivity selected by the operator. Note that, in the upper part of FIG. 13, the specified regions on the rs-fMRI image 61 are colored.

Subsequently, for example, as illustrated in the middle part of FIG. 13, the analysis function 353 specifies, on a morphological image 62, regions corresponding to the specified regions on the rs-fMRI image 61. In this process, the analysis function 353 deforms the model 42 for co-registration with the morphological image 62, thereby segmenting the region of the brain rendered in the morphological image 62 into a plurality of regions. Then, the analysis function 353 specifies regions at the same positions as those of the specified regions on the rs-fMRI image 61 from among the regions segmented on the morphological image 62. In this manner, the regions corresponding to the functional connectivity selected by the operator are specified on the morphological image 62. Note that, in the middle part of FIG. 13, the specified regions on the morphological image 62 are hatched.

After that, for example, as illustrated in the lower part of FIG. 13, the analysis function 353 identifies a plurality of regions connecting the specified regions on the morphological image 62. In this process, for example, the analysis function 353 identifies the regions connecting the specified regions on the morphological image 62 with use of a model containing information indicating structural connectivity among a plurality of regions of the brain. Note that, in the lower part of FIG. 13, the range including the specified regions is indicated by the solid lines.

Based on the specified regions on the morphological image 62, the analysis function 353 analyzes T2* weighted image data acquired by the first acquisition function 351, thereby extracting microbleeding regions included in the specified regions. Note that the analysis function 353 may further extract microbleeding regions in the vicinity of the specified regions. In this manner, the microbleeding regions are extracted that are related to a combination of regions corresponding to the functional connectivity selected by the operator.

In other words, while the analysis function 353 in the first embodiment extracts microbleeding regions based on a group of nerve fibers connecting regions, the analysis function 353 in the present embodiment extracts microbleeding regions based on regions connecting regions.

After that, similarly to the example described above with reference to FIG. 6 in the first embodiment, the analysis function 353 selectively displays only the extracted microbleeding regions among the microbleeding regions rendered in the T2* weighted image displayed on the display 340. Note that, for example, the analysis function 353 may display the number of microbleeds on the display 340 similarly to the example described above with reference to FIG. 9 in the second modification of the first embodiment. For example, in the case where two or more functional connectivities are selected by the operator, the analysis function 353 may display bleeding indices for each combination of regions corresponding to each functional connectivity similarly to the example described above with reference to FIG. 10 in the third modification of the first embodiment.

Figure 14:
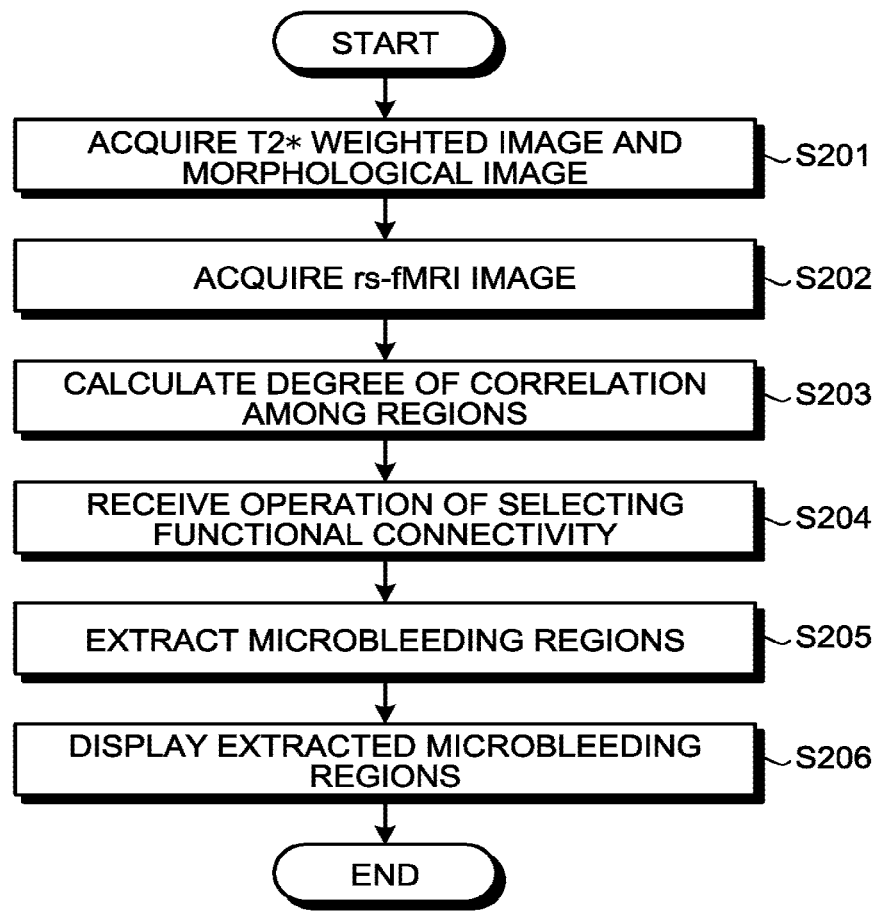
FIG. 14 is a flowchart illustrating a processing procedure of image processing by an image processing apparatus according to the second embodiment.

FIG. 14 is a flowchart illustrating a processing procedure of image processing by the image processing apparatus 300 according to the second embodiment. For example, as illustrated in FIG. 14, in the image processing apparatus 300 according to the present embodiment, the first acquisition function 351 acquires a T2* weighted image and a morphological image (Step S201). Step S201 is implemented by, for example, the processing circuitry 350 invoking a predetermined computer program corresponding to the first acquisition function 351 from the storage circuitry 320 and executing the computer program.

Subsequently, the second acquisition function 352 acquires an rs-fMRI image that is acquired from the same subject in the same examination as those for the T2* weighted image acquired by the first acquisition function 351 (Step S202). Step S202 is implemented by, for example, the processing circuitry 350 invoking a predetermined computer program corresponding to the second acquisition function 352 from the storage circuitry 320 and executing the computer program.

Subsequently, the analysis function 353 analyzes the rs-fMRI image acquired by the second acquisition function 352 to calculate the degree of correlation among regions for each combination of regions corresponding to the two or more predetermined functional connectivities (Step S203). After that, the analysis function 353 receives an operation of selecting a specific functional connectivity from among functional connectivities displayed on the display 340 from the operator (Step S204). The analysis function 353 analyzes T2* weighted image data to extract microbleeding regions related to regions corresponding to the selected functional connectivity (Step S205). Then, the analysis function 353 displays the extracted microbleeding regions (Step S206). Steps S203 to S206 are implemented by, for example, the processing circuitry 350 invoking a predetermined computer program corresponding to the analysis function 353 from the storage circuitry 320 and executing the computer program.

Note that, in FIG. 14, the execution order of the processing of acquiring a T2* weighted image by the first acquisition function 351 (Step S201) and the processing of acquiring an rs-fMRI image by the second acquisition function 352 and calculating the degree of correlation among regions (Steps S202 and S203) may be reversed.

As described above, according to the second embodiment, an MR image in which tissue properties of the brain are rendered is analyzed based on connection information indicating functional connectivity among regions of the brain, thereby enabling the relation between structural connectivity among regions of the brain and microbleeding morphological information on the MR image to be clearly presented as an image or an analytical value.

Functional connectivity represents a correlation among cortical regions of the brain in principle, and can define connectivity of nerve fibers that are highly related to the cortical regions. Therefore, based on a group of nerve fibers, the same method as in the first embodiment can be used to extract microbleeding regions and calculate bleeding indices to be selectively displayed.

As described above, similarly to the first embodiment, the second embodiment enables objects of interest scattered in the brain to be analyzed in association with connectivity among regions of the brain. Furthermore, the second embodiment enables characteristic microlesional regions displayed on a brain image to be analyzed in association with connectivity among regions of the brain.

Modifications of Second Embodiment

Note that, in the above-mentioned second embodiment, a description has been given of an example where the analysis function 353 specifies a functional connectivity having a high degree of correlation from among two or more predetermined functional connectivities based on an rs-fMRI image, but the embodiments are not limited thereto. For example, the analysis function 353 may simply use two or more predetermined functional connectivities directly without specifying a functional connectivity having a high degree of correlation based on an rs-fMRI image.

In this case, for example, the analysis function 353 displays two or more predetermined functional connectivities on the display 340 with the same GUI as in the example illustrated in FIG. 12, and receives an operation of selecting a specific functional connectivity from among the two or more displayed functional connectivities. Then, when a functional connectivity is selected by the operator, the analysis function 353 specifies regions corresponding to the functional connectivity selected by the operator on a model indicating structural connectivity related to a plurality of regions defined by functionally or anatomically segmenting a standard brain.

After that, the analysis function 353 specifies, on a morphological image, regions corresponding to the specified regions on the model. In this process, the analysis function 353 deforms the model for co-registration with the morphological image, thereby segmenting the region of the brain rendered in the morphological image into a plurality of regions. Then, the analysis function 353 specifies regions at the same positions as those of the specified regions on the model from among the regions segmented on the morphological image. In this manner, the regions corresponding to the functional connectivity selected by the operator are specified on the morphological image.

After that, the analysis function 353 identifies regions connecting the specified regions on the morphological image. In this process, for example, the analysis function 353 identifies the regions connecting the specified regions on the morphological image with use of a model containing information indicating structural connectivity among regions of the brain.

Based on the specified regions on the morphological image, the analysis function 353 analyzes T2* weighted image data acquired by the first acquisition function 351, thereby extracting microbleeding regions included in the specified regions. Note that the analysis function 353 may further extract microbleeding regions in the vicinity of the specified regions. In this manner, the microbleeding regions are extracted that are related to a combination of regions corresponding to the functional connectivity selected by the operator.

After that, similarly to the above-mentioned second embodiment, the analysis function 353 selectively displays the extracted microbleeding regions, displays the number of microbleeds on the display 340, and displays bleeding indices for each combination of the extracted regions.

According to the above-mentioned modification, an analysis can be made with simpler processing than in the case where an rs-fMRI image is used.

The first and second embodiments have been described above. In the above-mentioned embodiments, a description has been given of an example where the analysis function 353 analyzes microbleeds in a T2* weighted image, but the embodiments are not limited thereto. For example, the analysis function 353 may analyze lacunar infarction in a FLAIR image, susceptibility in a quantitative susceptibility map, or a fractional anisotropy (FA) value, a mean diffusivity (MD) value, or an apparent diffusion coefficient (ADC) value in a DTI image.

Third Embodiment

While the embodiments of the image processing apparatus are described in the above-mentioned first and second embodiments, the embodiments of the technology disclosed herein are not limited thereto. For example, the technology disclosed herein is applicable also to an MRI apparatus. An embodiment of an MRI apparatus is now described as a third embodiment.

Figure 15:
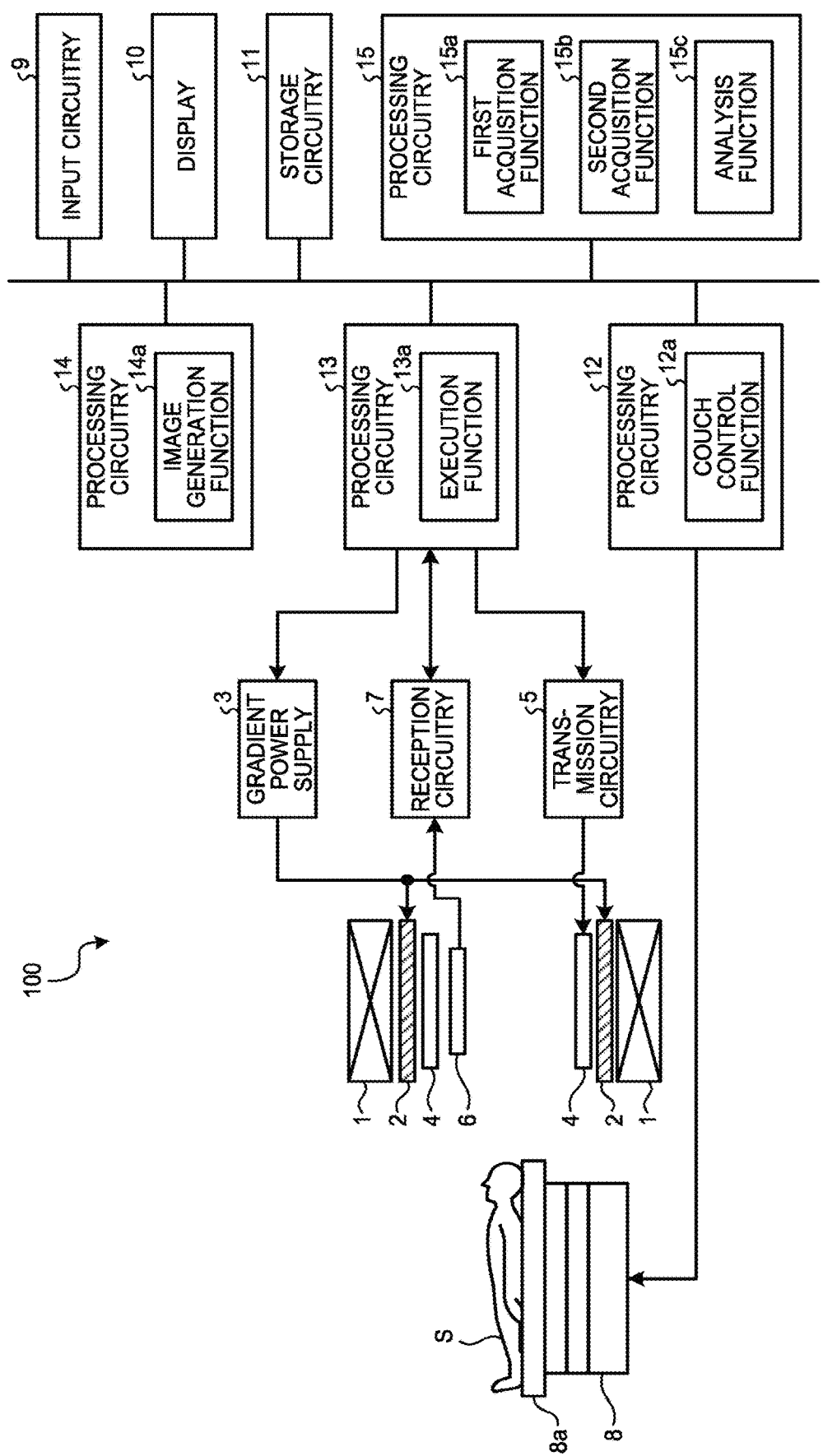
FIG. 15 is a diagram illustrating a configuration example of a magnetic resonance imaging (MRI) apparatus according to a third embodiment.

FIG. 15 is a diagram illustrating a configuration example of the MRI apparatus according to the third embodiment. For example, as illustrated in FIG. 15, an MRI apparatus 100 includes a static magnetic field magnet 1, a gradient coil 2, a gradient power supply 3, a transmission coil 4, transmission circuitry 5, a reception coil 6, reception circuitry 7, a couch 8, input circuitry 9, a display 10, storage circuitry 11, processing circuitry 12, processing circuitry 13, processing circuitry 14, and processing circuitry 15.

The static magnetic field magnet 1 is formed into a hollow substantially cylindrical shape (including a shape having an elliptical cross-section orthogonal to the central axis of a cylinder), and generates a uniform static magnetic field in an imaging space formed on an inner circumferential side of the static magnetic field magnet 1. For example, the static magnetic field magnet 1 is formed by a permanent magnet or a superconducting magnet.

The gradient coil 2 is formed into a hollow substantially cylindrical shape (including a shape having an elliptical cross-section orthogonal to the central axis of a cylinder), and is disposed on the inner circumferential side of the static magnetic field magnet 1. The gradient coil 2 includes three coils configured to generate gradient magnetic fields along the x axis, the y axis, and the z axis orthogonal to one another. The x axis, the y axis, and the z axis constitute the natural coordinate system of the MRI apparatus 100. For example, the direction of the x axis is set as the vertical direction, and the direction of the y axis is set as the horizontal direction. The direction of the z axis is set as the same direction as the magnetic flux direction of the static magnetic field generated by the static magnetic field magnet 1.

The gradient power supply 3 supplies currents independently to the three coils included in the gradient coil 2, thereby generating the gradient magnetic fields along the x axis, the y axis, and the z axis in the imaging space. Appropriate generation of the gradient magnetic fields along the x axis, the y axis, and the z axis can generate gradient magnetic fields along a readout direction, a phase encoding direction, and a slice direction that are orthogonal to one another. The axes along the readout direction, the phase encoding direction, and the slice direction constitute a logical coordinate system for defining a slice region or a volume region to be imaged. Note that, in the following, the gradient magnetic field along the readout direction is referred to as "readout gradient magnetic field", the gradient magnetic field along the phase encoding direction is referred to as "phase encoding gradient magnetic field", and the gradient magnetic field along the slice direction is referred to as "slice gradient magnetic field".

Each gradient magnetic field is superimposed on the static magnetic field generated by the static magnetic field magnet 1, and is used to give spatial positional information to a magnetic resonance (MR) signal. Specifically, the readout gradient magnetic field gives positional information along the readout direction to the MR signal by changing the frequency of the MR signal depending on the position in the readout direction. The phase encoding gradient magnetic field gives positional information along the phase encoding direction to the MR signal by changing the phase of the MR signal along the phase encoding direction. The slice gradient magnetic field is used to determine the direction, thickness, and number of slice regions in the case where an imaging region is a slice region. In the case where an imaging region is a volume region, the slice gradient magnetic field gives positional information along the slice direction to the MR signal by changing the phase of the MR signal depending on the position in the slice direction.

The transmission coil 4 is formed into a hollow substantially cylindrical shape (including a shape having an elliptical cross-section orthogonal to the central axis of a cylinder), and is disposed on the inner side of the gradient coil 2. The transmission coil 4 applies a radio frequency (RF) pulse output from the transmission circuitry 5 to an imaging space.

The transmission circuitry 5 outputs an RF pulse corresponding to the Larmor frequency to the transmission coil 4. For example, the transmission circuitry 5 includes an oscillation circuit, a phase selection circuit, a frequency conversion circuit, an amplitude modulation circuit, and an RF amplifier circuit. The oscillation circuit generates an RF pulse having a natural resonance frequency of a target atomic nucleus placed in the static magnetic field. The phase selection circuit selects the phase of the RF pulse output from the oscillation circuit. The frequency conversion circuit converts the frequency of the RF pulse output from the phase selection circuit. The amplitude modulation circuit modulates the amplitude of the RF pulse output from the frequency conversion circuit, for example, in accordance with the sinc function. The RF amplifier circuit amplifies the RF pulse output from the amplitude modulation circuit, and outputs the resultant signal to the transmission coil 4.

The reception circuitry 7 generates MR signal data based on an MR signal output from the reception coil 6, and outputs the generated MR signal data to the processing circuitry 13. For example, the reception circuitry 7 includes a selection circuit, a preamplifier circuit, a phase detection circuit, and an analog-digital conversion circuit. The selection circuit selectively receives an MR signal output from the reception coil 6. The preamplifier circuit amplifies the MR signal output from the selection circuit. The phase detection circuit detects the phase of the MR signal output from the preamplifier circuit. The analog-digital conversion circuit converts the analog signal output from the phase detection circuit into a digital signal to generate MR signal data, and outputs the generated MR signal data to the processing circuitry 13.

While an example where the transmission coil 4 applies an RF pulse and the reception coil 6 receives an MR signal is herein described, the modes of the transmission coil and the reception coil are not limited thereto. For example, the transmission coil 4 may further have a reception function of receiving an MR signal. The reception coil 6 may further have a transmission function of applying an RF magnetic field. When the transmission coil 4 has the reception function, the reception circuitry 7 generates MR signal data from an MR signal received by the transmission coil 4 as well. When the reception coil 6 has the transmission function, the transmission circuitry 5 outputs an RF pulse to the reception coil 6 as well.

The couch 8 includes a couchtop 8a for mounting the subject S thereon. In imaging the subject S, the couchtop 8a is inserted into an imaging space formed inside the static magnetic field magnet 1 and the gradient coil 2. For example, the couch 8 is installed so that the longitudinal direction thereof is parallel to the central axis of the static magnetic field magnet 1.

The input circuitry 9 receives an input operation of various kinds of instructions and various kinds of information from the operator. Specifically, the input circuitry 9 is connected to the processing circuitry 15, and converts an input operation received from the operator into an electric signal and outputs the converted electric signal to the processing circuitry 15. For example, the input circuitry 9 is implemented by a trackball, a switch button, a mouse, a keyboard, or a touch panel.

The display 10 displays various kinds of information and various kinds of images. Specifically, the display 10 is connected to the processing circuitry 15, and converts data on various kinds of information and various kinds of images output from the processing circuitry 15 into display electric signals to output the resultant signals. For example, the display 10 is implemented by a liquid crystal monitor, a cathode ray tube (CRT) monitor, or a touch panel.

The storage circuitry 11 stores various kinds of data. Specifically, the storage circuitry 11 stores MR signal data and image data for each subject S. For example, the storage circuitry 11 is implemented by a semiconductor memory device such as a random access memory (RAM) and a flash memory, a hard disk, or an optical disc.

The processing circuitry 12 has a couch control function 12a. Specifically, the couch control function 12a is connected to the couch 8, and outputs a control electric signal to the couch 8 to control the operation of the couch 8. For example, the couch control function 12a receives an instruction to move the couchtop 8a in the longitudinal direction, the vertical direction, or the horizontal direction through the input circuitry 9 from the operator, and operates a drive mechanism of the couchtop 8a, which is included in the couch 8, so that the couchtop 8a moves in accordance with the received instruction. For example, the processing circuitry 12 is implemented by a processor.

The processing circuitry 13 has an execution function 13a. Specifically, the execution function 13a executes various kinds of pulse sequences. Specifically, the execution function 13a drives the gradient power supply 3, the transmission circuitry 5, and the reception circuitry 7 based on sequence execution data output from the processing circuitry 15, thereby executing various kinds of pulse sequences. For example, the processing circuitry 13 is implemented by a processor.

Sequence execution data is information that defines a pulse sequence indicating a procedure for acquiring MR signal data. Specifically, sequence execution data is information that defines the timing at which the gradient power supply 3 supplies current to the gradient coil 2, the intensity of the supplied current, the intensity and supply timing of the RF pulse current to be supplied from the transmission circuitry 5 to the transmission coil 4, and the detection timing at which the reception circuitry 7 detects an MR signal.

As a result of executing various kinds of pulse sequences, the execution function 13a receives MR signal data from the reception circuitry 7, and stores the received MR signal data in the storage circuitry 11. Note that a set of MR signal data received by the execution function 13a are two-dimensionally or three-dimensionally arrayed depending on the positional information given by the above-mentioned readout gradient magnetic field, phase encoding gradient magnetic field, and slice gradient magnetic field, and the set of MR signal data is stored in the storage circuitry 11 as data for k-space.

The processing circuitry 14 has an image generation function 14a. For example, the processing circuitry 14 is implemented by a processor. The image generation function 14a generates an image based on MR signal data stored in the storage circuitry 11. Specifically, the image generation function 14a reads MR signal data stored in the storage circuitry 11 by the execution function 13a, and subjects the read MR signal data to post processing, that is, reconstruction processing such as the Fourier transform, thereby generating an image. Furthermore, the image generation function 14a stores image data on the generated image in the storage circuitry 11.

The processing circuitry 15 controls each component included in the MRI apparatus 100 to control the overall MRI apparatus 100. For example, the processing circuitry 15 is implemented by a processor. For example, the processing circuitry 15 receives an input of various kinds of parameters relating to pulse sequences from the operator through the input circuitry 9, and generates sequence execution data based on the received parameters. Then, the processing circuitry 15 transmits the generated sequence execution data to the processing circuitry 13 to execute various kinds of pulse sequences. Furthermore, for example, the processing circuitry 15 reads image data on an image requested from the operator from the storage circuitry 11, and outputs the read image to the display 10.

The above description is a configuration example of the MRI apparatus 100 according to the present embodiment. With this configuration, the MRI apparatus 100 can analyze objects of interest scattered in the brain in association with connectivity among regions of the brain.

Specifically, the processing circuitry 15 has a first acquisition function 15a, a second acquisition function 15b, and an analysis function 15c.

The first acquisition function 15a has the same function as the first acquisition function 351 described in the above-mentioned embodiments and modifications. While the first acquisition function 351 in the above-mentioned embodiments and modifications acquires an MR image from the MRI apparatus 100 or the image storage apparatus 200, the first acquisition function 15a in the present embodiment acquires an MR image from the storage circuitry 11.

The second acquisition function 15b has the same functions as the second acquisition function 352 described in the above-mentioned embodiments and modifications. While the second acquisition function 352 in the above-mentioned embodiments and modifications acquires connection information from the MRI apparatus 100 or the image storage apparatus 200, the second acquisition function 15b in the present embodiment acquires connection information from the storage circuitry 11.

The analysis function 15c has the same functions as the analysis function 353 described in the above-mentioned embodiments and modifications.

In the present embodiment, the input circuitry 9, the display 10, and the storage circuitry 11 further have the functions of the input circuitry 330, the display 340, and the storage circuitry 320 described in the above-mentioned embodiments and modifications.

A description has been given of each processing function included in the processing circuitry 15. For example, the above-mentioned processing functions are stored in the storage circuitry 11 in the form of computer programs that can be executed by a computer. The processing circuitry 15 reads each computer program from the storage circuitry 11 and executes the read computer program, thereby implementing the processing function corresponding to each computer program. In other words, the processing circuitry 15 that has read each computer program has each processing function illustrated in FIG. 15.

Note that, in FIG. 15, a description has been given of an example where the processing functions of the first acquisition function 15a, the second acquisition function 15b, and the analysis function 15c are implemented by the single processing circuitry 15, but the embodiments are not limited thereto. For example, the processing circuitry 15 may be configured by a combination of independent processors, and each processing function may be implemented by each processor executing each computer program. Each processing function included in the processing circuitry 15 may be implemented in a manner that the processing functions are appropriately distributed or integrated in a single or plurality of processing circuits.

The above-mentioned configuration of the third embodiment enables, similarly to the first and second embodiments, objects of interest scattered in the brain to be analyzed in association with connectivity among regions of the brain. Furthermore, the third embodiment enables characteristic microlesional regions displayed on a brain image to be analyzed in association with connectivity among regions of the brain.

The term "processor" used in the above-mentioned embodiments means, for example, a central processing unit (CPU), a graphics processing unit (GPU), or a circuit such as an application specific integrated circuit (ASIC) and a programmable logic device (for example, a simple programmable logic device (SPLD), a complex programmable logic device (CPLD), and a field programmable gate array (FPGA)). A computer program may be directly incorporated in a circuit of the processor instead of storing a computer program in the storage circuitry. In this case, the processor implements its functions by reading and executing the computer programs incorporated in the circuit. Each processor in the present embodiment is not limited to the case where each processor is configured as a single circuit, and a plurality of independent circuits may be combined to configure a single processor so as to implement their functions.

According to at least one of the embodiments described above, objects of interest scattered in the brain can be analyzed in association with connectivity among regions of the brain.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
processing circuitry configured to:
acquire a magnetic resonance (MR) image in which objects of interest scattered in a brain of a subject are rendered;
acquire connection information indicating connectivity among a plurality of regions of the brain;
specify regions having a connection relation from the plurality of regions by using the connection information; and
perform, by using the MR image, an analysis of an object of interest included in a plurality of regions connecting the regions specified as having the connection relation, and thereby calculate analytical values.

2. The image processing apparatus according to claim 1, wherein the processing circuitry performs control to display a matrix indicating a connection relation among the regions, and performs control to display analytical results of the analysis in a corresponding cell in the matrix.

3. The image processing apparatus according to claim 1, wherein the processing circuitry distinguishes between connection information in a direction from a first region to a second region and connection information in a direction from the second region to the first region, and calculates the analytical value correspondingly to each of the directions.

4. The image processing apparatus according to claim 2, wherein the processing circuitry distinguishes between a direction from a first region to a second region and a direction from the second region to the first region, and performs control to display the analytical value calculated correspondingly to each of the directions in a corresponding cell in the matrix.

5. The image processing apparatus according to claim 1, wherein the processing circuitry specifies the regions by using connection information obtained from the same subject as the subject of the MR image.

6. The image processing apparatus according to claim 1, wherein the processing circuitry specifies the regions by using connection information that is obtained by another protocol executed in the same examination as an examination for a protocol for acquiring the MR image.

7. The image processing apparatus according to claim 1, wherein the processing circuitry specifies the regions by using connection information indicating structural connectivity among the regions.

8. The image processing apparatus according to claim 7, wherein the processing circuitry specifies the regions by using, as the connection information, a diffusion tensor tractography (DTT) image in which nerve fibers of the brain are rendered.

9. The image processing apparatus according to claim 1, wherein the processing circuitry specifies the regions by using connection information indicating functional connectivity among the regions.

10. The image processing apparatus according to claim 8, wherein the processing circuitry uses, as the connection information, a resting state functional MRI (rs-fMRI) image representing a correlation among a plurality of regions of the brain and uses a model indicating structural connectivity about a plurality of regions defined by functionally or anatomically segmenting a standard brain, so as to perform the analysis on regions that have a correlation based on the rs-fMRI image.

11. The image processing apparatus according to claim 10, wherein the processing circuitry deforms the model for co-registration with a morphological image of the brain acquired in the same examination as a protocol for acquiring the MR image, so as to specify structural connectivity among the regions.

12. The image processing apparatus according to claim 2, wherein the processing circuitry performs control to change a display form of a region allocated with the analytical results in the displayed MR image depending on the analytical results.

13. The image processing apparatus according to claim 2, wherein the processing circuitry performs control to display the analytical results for each combination of regions having a connection relation.

14. The image processing apparatus according to claim 1, wherein the processing circuitry acquires, as the MR image, one of a T1 weighted image, a T2* weighted image, a susceptibility weighted image, a quantitative susceptibility map, a fluid attenuation inversion recovery (FLAIR) image, a diffusion weighted image, and a diffusion tensor imaging (DTI) image.

15. An image processing apparatus, comprising:
processing circuitry configured to control a display to display a matrix thereon, the matrix graphically indicating a connection relation among a plurality of regions of a brain, wherein
the processing circuitry is further configured to control the display so as to display, for each combination of two different regions included in the plurality of regions, a first analytical value calculated with weighting one of the different regions and a second analytical value calculated with weighting the other of the different regions in corresponding cells in the matrix respectively.

16. A magnetic resonance imaging apparatus, comprising:
processing circuitry configured to:
generate an MR image in which objects of interest scattered in a brain of a subject are rendered;
generate connection information indicating connectivity among a plurality of regions of the brain;
specify regions having a connection relation from the plurality of regions by using the connection information; and
perform, by using the MR image, an analysis of an object of interest included in a plurality of regions connecting the regions specified as having the connection relation, and thereby calculate analytical values.

* * * * *